US006236898B1

(12) United States Patent
Kim

(10) Patent No.: US 6,236,898 B1
(45) Date of Patent: May 22, 2001

(54) ERROR COMPENSATION CIRCUIT FOR COMPENSATING FOR PARAMETER ERRORS OF AN IC CHIP HAVING A FILTER AND A BOOST CIRCUIT

(75) Inventor: Chun-Sup Kim, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/127,631

(22) Filed: Aug. 3, 1998

(30) Foreign Application Priority Data

Aug. 2, 1997 (KR) .................................................. 97 37102

(51) Int. Cl.[7] ............................. G05B 11/01; G05B 1/00
(52) U.S. Cl. ................................ 700/71; 700/30; 375/334
(58) Field of Search ................................. 700/21, 28, 29, 700/30, 121, 78, 54, 71; 714/1, 47, 724, 115; 716/4; 375/334, 344

(56) References Cited

U.S. PATENT DOCUMENTS

| 3,959,770 | * | 5/1976 | Schaefer | 714/115 |
| 4,457,471 | * | 7/1984 | Herwig | 56/10.2 G |
| 4,490,688 | * | 12/1984 | Borras et al. | 331/1 A |
| 4,924,226 | * | 5/1990 | Adams | 341/157 |
| 5,732,111 | * | 3/1998 | Walley | 375/344 |
| 5,781,588 | * | 7/1998 | Abe et al. | 375/334 |
| 6,023,491 | * | 2/2000 | Saka et al. | 375/326 |
| 6,067,332 | * | 5/2000 | Taura et al. | 375/344 |

* cited by examiner

Primary Examiner—William Grant
Assistant Examiner—Kidest Bahta
(74) Attorney, Agent, or Firm—Staas & Halsey LLP

(57) ABSTRACT

An error compensation circuit for compensating for a frequency error and a boost error of an IC chip having a filter and a boost circuit. The error compensation circuit includes a frequency compensation circuit, a boost compensation circuit, and a switch being switchable in response to a mode control signal. The frequency compensation circuit includes a first level detector to detect a level of a signal output from the filter; a first level comparator to compare an output level of the first level detector with a reference signal level; a first integrator to integrate an output of the first level comparator to generate a frequency error signal; and a first data converter and storage to convert the stored digital data into an analog frequency compensation signal in the normal signal processing mode, and provide the frequency compensation signal to the filter. The boost compensation circuit includes a second level detector to detect a level of a signal output from the boost circuit; a second level comparator to compare an output level of the second level detector with the reference signal level; a second integrator to integrate an output of the second level comparator to generate a boost error signal; and a second data converter and storage to convert the boost error signal into digital data, store the digital data, convert the stored digital data into an analog boost compensation signal in the normal signal processing mode, and provide the boost compensation signal to the boost circuit.

20 Claims, 3 Drawing Sheets

ERROR COMPENSATION CIRCUIT FOR COMPENSATING FOR PARAMETER ERRORS OF AN IC CHIP HAVING A FILTER AND A BOOST CIRCUIT

CROSS-REFERENCE TO RELATED APPLICATIONS

This application claims the benefit of Korean Application No. 37102/1997, filed Aug. 2, 1997, in the Korean Patent Office, the disclosure of which is incorporated herein by reference.

BACKGROUND OF THE INVENTION

1. Field of the Invention

The present invention relates to a compensation circuit for parameter errors (or processing errors) of elements, which may be generated in the fabrication process of an integrated circuit (IC) chip, and in particular, to an error compensation circuit for compensating for a frequency error of a filter and a boosting error of a boost circuit in an equalizer IC chip for use in an optical disk player.

2. Description of the Related Art

An optical disk player such as a DVD (Digital Video Disk) player includes an equalizer filter for use in a read channel. As to the equalizer filter, it is necessary to reduce a permissible error of a frequency characteristic and a boosting gain, as much as possible. However, during the process of fabricating an IC chip including the equalizer filter, parameters of the elements such as resistors, capacitors and transistors may be deviated by over +/−20% from the designed parameters. As a result, in the worst case, the frequency characteristic and the boosting gain of the equalizer filter may greatly deviate from the designed values, exceeding the permissible error. Accordingly, prior to the shipment of the IC chip, it is necessary to detect parameter errors (i.e., processing errors) generated during the manufacturing process and compensate for the deviation (i.e., the parameter errors), so as to optimize the frequency characteristic and the boosting level.

SUMMARY OF THE INVENTION

It is therefore an object of the present invention to provide an error compensation circuit capable of detecting parameter errors generated in the process of manufacturing an IC chip having a filter and a boost circuit and automatically compensating for deviation from designed parameters thereof.

It is another object of the present invention to provide an error compensation circuit for optimally maintaining a frequency characteristic and a boost level of an IC chip having an equalizer filter for use in a read channel of an optical disk player.

To achieve the above and other objects of the present invention, there is provided an error compensation circuit for compensating for a frequency error and a boost error of an IC chip having a filter and a boost circuit. The error compensation circuit includes a frequency compensation circuit, a boost compensation circuit, and a switch being switchable to a first reference signal in an error compensation mode and to an input signal in a normal signal processing mode. The frequency compensation circuit includes a first level detector to detect a level of a signal output from the filter; a first level comparator to compare an output level of the first level detector with a second reference signal level; a first integrator to integrate an output of the first level comparator to generate a frequency error signal; and a first data converter and storage and to convert the frequency error signal into digital data, store the digital data, convert the stored digital data into an analog frequency compensation signal in the normal signal processing mode, and provide the frequency compensation signal to the filter. The boost compensation circuit includes a second level detector to detect a level of a signal output from the boost circuit; a second level comparator to compare an output level of the second level detector with the second reference signal level, a second integrator to integrate an output of the second level comparator to generate a boost error signal; and a second data converter and storage to convert the boost error signal into digital data, store the digital data, convert the stored digital data into an analog boost compensation signal in the normal signal processing mode, and provide the boost compensation signal to the boost circuit.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Two preferred embodiment of the present invention will be described in detail hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well-known functions or constructions have not been described so as not to obscure the present invention.

Figure 1:
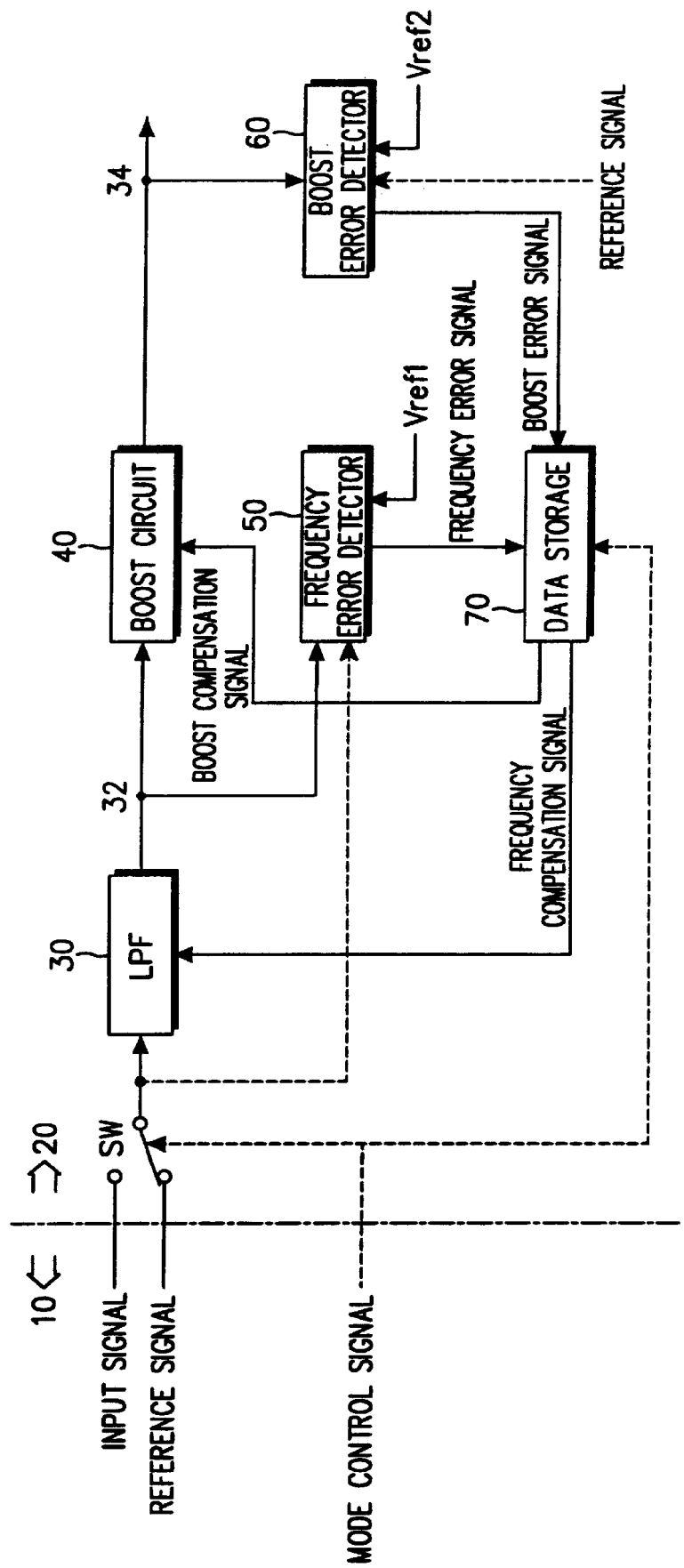
FIG. 1 is a block diagram of an equalizer IC chip according to an embodiment of the present invention.
Figure 2A:
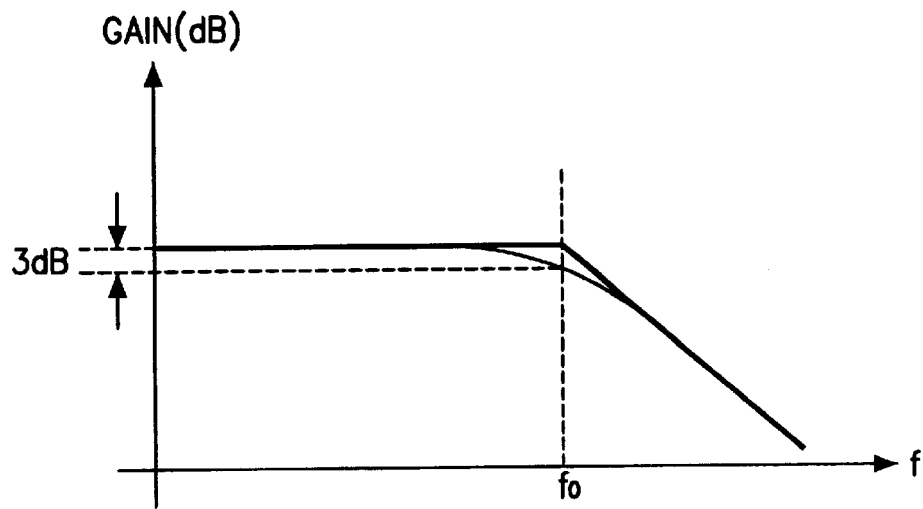
FIGS. 2A and 2B are diagrams illustrating output characteristics of a lowpass filter and a boost circuit of FIG. 1, respectively.
Figure 2B:
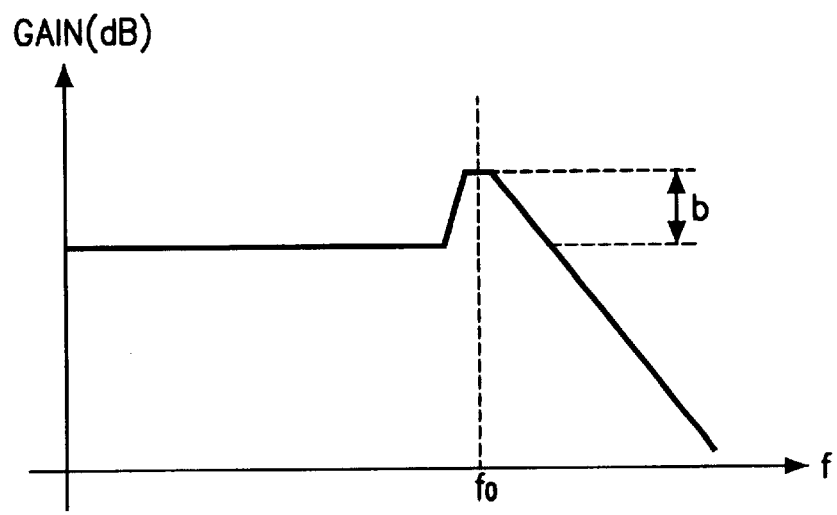
Figure 3:
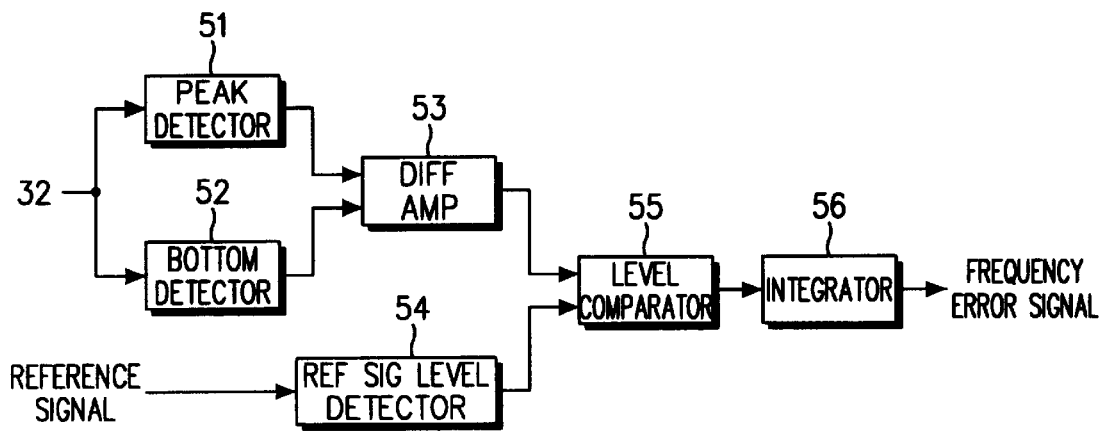
FIG. 3 is a block diagram of a frequency error detector of FIG. 1.
Figure 4:
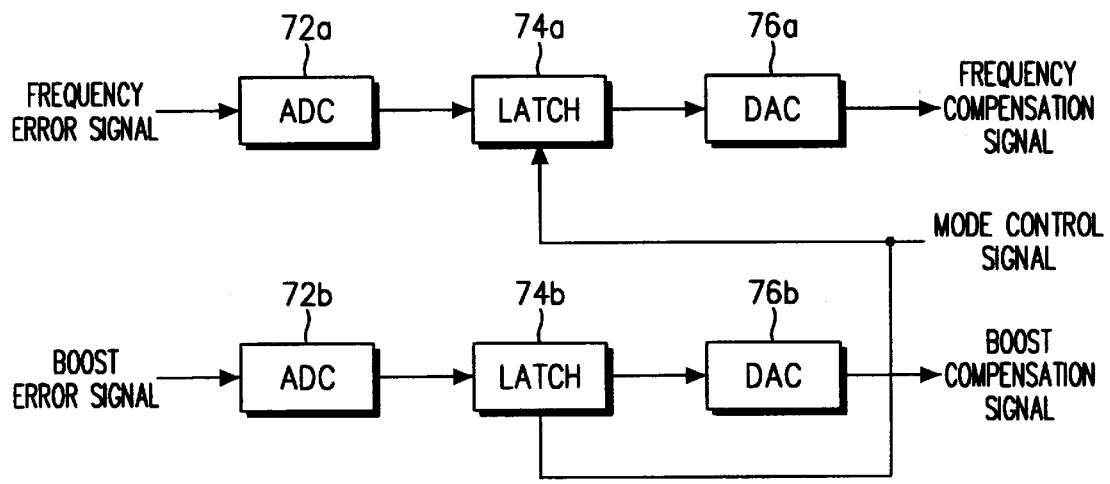
FIG. 4 is a block diagram of a data converter and storage of FIG. 1.

FIG. 1 illustrates a block diagram of both equalizer IC chip according to an embodiment of the present invention. FIGS. 2A and 2B illustrate output characteristics of a lowpass filter 30 and a boost circuit 40 of FIG. 1, respectively. FIG. 3 shows a block diagram of a frequency error detector 50 of FIG. 1, and FIG. 4 shows a block diagram of a data converter and storage 70 of FIG. 1.

Referring to FIG. 1, reference numerals 10 and 20 denote the exterior and interior of the equalizer IC chip, respectively. As illustrated, the equalizer IC chip includes a lowpass filter (LPF) 30 for lowpass filtering an input signal input from an optical disk, and a boost circuit 40 for boosting up a level of a lowpass filtered signal 32 from the lowpass filter 30 with a predetermined boosting gain. The lowpass filter 30 and the boost circuit 40 have the output characteristics as shown in FIGS. 2A and 2B, respectively. Further, the equalizer IC chip includes an error compensation circuit including a frequency error detector 50, a boost error detector 60, a data storage 70, and a switch SW. The switch SW has a movable end (or a common end) connected to an input end of the lowpass filter 30, a fixed end connected to the input signal input from the optical disk, and another fixed end connected to a reference signal for compensating for the parameter errors of the lowpass filter 30 and the boost circuit 40, which are generated in the manufacturing process. The switch SW is switchable in response to a mode control signal input from the exterior of the equalizer IC chip. The mode control signal is used in detecting the parameter errors generated in the manufacturing process of the equalizer IC chip to compensate for the detected parameter errors. In the following description, it should be noted that the switch SW is switched to the reference signal in an error compensation mode and to the input signal in a normal signal processing mode.

The frequency error detector 50 receives various inputs: the signal from the lowpass filter 30 (the lowpass signal 32); and one of the reference signal from the switch SW (first preferred embodiment) or a reference signal Vref1 having a given reference voltage level (second preferred embodiment). The frequency error detector 50 has a construction as shown in FIG. 3. A peak detector 51 detects a peak value of the lowpass filtered signal 32 and a bottom detector 52 detects a bottom value of the lowpass filtered signal 32. A differential amplifier 53 amplifies a level difference between the peak value output from the peak detector 51 and the bottom value output from the bottom detector 52. A level comparator 55 compares an output level of the differential amplifier 53 with a level of reference signal, preferably Vref1 input through a reference signal level detector 54. The reference signal level detector 54 detects the level of a input during the error compensation mode. In accordance the second preferred embodiment, a reference voltage level Vref may be supplied to the frequency error detector 50, as illustrated by the solid line inputs in FIG. 1 (but not shown in FIG. 3), without the reference signal level detector 54. The reference voltage level Vref1 is directly supplied to the level comparator 55 and compared with the differentially amplified level and used for detecting a design parameter error. By comparing Vref1 with the output of the differential amplifier 53, the level comparator 55 detects the parameter error (i.e., the frequency error) according to the manufacturing process and generates a pulse signal. An integrator 56 integrates the pulse signal output from the level comparator 55 to generate an analog frequency error signal.

Referring back to FIG. 1, though not illustrated, the boost error detector 60 has the same construction as that of the frequency error detector 50. The boost error detector 60 receives various inputs: the output of the boost circuit 40; and one of the reference signal from the switch SW (first embodiment) or a reference signal Vref2 having a given reference voltage level (second preferred embodiment); and. The boost error detector 60 compares a boost signal 34 of the boost circuit 40 with one of the reference signals, preferably and integrates the pulse signal generated according to the comparison, to generate an analog boost error signal. Further, the data storage 70 is constructed as shown in FIG. 4.

Referring to FIG. 4, the data storage 70 includes analog-to-digital converters (ADC) 72a, 72b, latches 74a, 74b and digital-to-analog-converters (DAC) 76a, 76b. The ADCs 72a, 72b convert the analog frequency error signal and the analog boost error signal from the frequency error detector 50 and the boost error detector 60 into digital frequency error data and digital boost error data, respectively. The latches 74a, 74b latch the digital frequency error data and the digital boost error data according to the mode control signal input, respectively. The DACs 76a, 76b convert the digital data output from the latch 74a, 74b into an analog frequency compensation signal and an analog boost compensation signal, respectively.

Now referring to FIGS. 1 through 4, operation of the error compensation circuit will be described in detail.

The equalizer filter used for a read channel of the DVD player is subject to the following parameter compensation before a normal signal processing. First, the activated mode control signal is applied to the equalizer IC chip, to switch the common end of switch SW to the reference signal. Then, the reference signal having a specific frequency is input to the frequency error detector 50 and is lowpass filtered by the lowpass filter 30 of which parameter error is not yet compensated for, and applied to the boost circuit 40 and the frequency error detector 50. The frequency error detector 50 primarily detects the level of the lowpass filtered signal 32. Specifically describing the level detection, referring to FIG. 3, the peak detector 51 and the bottom detector 52 detect both the peak and bottom levels of the lowpass filtered signal 32, irrespective of the deviation of the input signal. The level difference between the detected peak and bottom levels is amplified by the differential amplifier 53 and then applied to the level comparator 55. Here, the differential amplifier 53 has a specific gain at a frequency $f_0$ where its output signal is to be compared with a reference signal, preferably Vref1. The level comparator 55 compares the output signal of the differential amplifier 53 with Vref1 or the reference signal from switch SW input through the reference signal level detector 54. Optionally, a reference signal Vref1 may be directly applied to the level comparator 55, without passing through the reference signal level detector 54. In this case, the reference signal should be controlled such that the gain becomes −3 dB at the frequency $f_0$. The level comparator 55 generates the pulse signal according to the comparison of the used reference signal with the output of the differential amplifier 53. The integrator 56 integrates the pulse signal output from the level comparator 55 to generate the frequency error signal. The frequency error signal is converted by the ADC 72a into the digital frequency error data and stored in the latch 74a in response to the mode control signal. The digital frequency error data stored in the latch 74a is converted by the DAC 76a into the frequency compensation signal. Coefficients (e.g. transconductance [gm]) of the elements constituting the lowpass filter 30 may vary according to the frequency compensation signal, thereby minimizing the parameter errors. Further, the lowpass filtered signal 32 is boosted up to the signal level 34 at the frequency $f_0$ by a boosting gain "b" (see FIG. 2B). In the same manner as described above with regard to the generation of the frequency compensation signal, the boost error detector 60 detects and compensates for the boost error of the boost circuit 40. In the meantime, if the mode control signal is inactivated, the common end of the switch SW is switched to the input signal in response to the inactivated mode control signal. Then, the latches 74a, 74b maintain (or latch) the digital data stored therein in response to the inactivated mode control signal, so that the frequency characteristic of the lowpass filter 30 and the boosting level of the boost circuit 40 may be maintained within the permissible range of the designed parameter.

As described above, the error compensation circuit of the invention automatically compensates for the parameter errors (i.e., frequency error and boost error), in case the frequency characteristic of the filter and the boosting level of the boost circuit are deviated from the permissible range of the designed parameters due to the characteristic change of the resistors, capacitors, and transistors during the manufacturing process of the IC chip. Therefore, it is possible to maintain the frequency characteristic of the filter and the boosting level of the boost circuit within the permissible range of the designed parameters.

While the present invention has been described in detail with reference to the specific embodiments, they are mere exemplary applications. Thus, it is to be clearly understood that many variations can be made by anyone skilled in the art within the scope and spirit of the present invention.

What is claimed:

1. An error compensation circuit for compensating for a design parameter error, comprising:

a filter filtering an input signal with a frequency characteristic;

a switch selecting a normal input signal, in a normal input signal processing mode, and a reference signal, in an error compensation mode, and outputting the selected signal to said filter;

a frequency error detector, in the error compensation mode,
detecting an output signal level from said filter,
comparing the output signal level with a given reference voltage level to produce a comparison result,
integrating the comparison result, and
generating a frequency error signal used to compensate for design parameter errors caused by the frequency characteristic of said filter;

a storage storing the frequency error signal from said frequency error detector; and a controller controlling said switch according to one of the normal input signal processing mode and the error compensation mode, and providing the frequency error signal stored within said storage to said filter as an error compensation signal in the normal signal processing mode.

2. The error compensation circuit as claimed in claim 1, wherein said frequency error detector comprises:

a peak detector detecting and outputting a peak value of the output signal from said filter;

a bottom detector detecting and outputting a bottom value of the output signal from said filter;

a differential amplifier amplifying a level difference between the peak value and the bottom value, to generate an amplified difference level;

a level comparator comparing the amplified difference level with the given reference voltage level, and generating a comparison signal with the comparison result; and an integrator integrating the comparison signal to generate the frequency error signal.

3. The error compensation circuit as claimed in claim 1, wherein said storage comprises:

an analog-to-digital converter converting the frequency error signal into a digital frequency error signal;

a latch latching the digital frequency error signal and generating a digital frequency compensation signal; and a digital-to-analog convertor converting the digital frequency compensation signal into a analog frequency compensation signal, wherein said digital-to-analog convertor outputting the analog frequency compensation signal to said filter as a frequency compensation signal.

4. An error compensation circuit for compensating for a design parameter error, comprising:

a filter filtering an input signal with a frequency characteristic;

a switch selecting one of a normal input signal, in a normal input signal processing mode, and a reference signal, in an error compensation mode, and outputting the selected signal to said filter;

a frequency error detector, in an error compensation mode,
detecting an output signal level from said filter,
receiving the reference signal,
comparing the output signal level with a level of the reference signal, and
integrating a result of the comparison to generate a frequency error signal to compensate for a design parameter based on the frequency characteristic of said filter;

a storage storing the frequency error signal from said frequency error detector; and a controller controlling said switch based on one of the normal input signal processing mode and the error compensation mode, and providing the frequency error signal stored within said storage to said filter in the normal signal processing mode.

5. The error compensation circuit as claimed in claim 4, wherein said frequency error detector comprises:

a peak detector detecting and outputting a peak value of the signal from said filter;

a bottom detector detecting and outputting a bottom value of the signal output from said filter;

a differential amplifier amplifying a level difference between the peak value and the bottom value, to generate the amplified difference level;

a reference signal level detector detecting and outputting the reference signal level prior to filtering;

a level comparator comparing the amplified difference level with the reference signal level to generate a comparison signal; and an integrator integrating the comparison signal to generate the frequency error signal.

6. An error compensation circuit comprising:

a boost circuit boosting a gain of a predetermined frequency region of a selected input signal;

a switch selecting a normal input signal, in a normal signal processing mode and a reference signal, in an error compensation model and outputting the selected signal to said boost circuit;

a boost error detector, in an error compensation mode,
detecting an output signal level from said boost circuit,
comparing the output signal level with a given reference voltage level, and
integrating the compared result to generate a boost error signal used to compensate on the design parameter based on a boosting level of said boost circuit;

a storage storing the boost error signal from said boost error detector; and a controller controlling said switch according to one of the normal input signal processing mode and the error compensation mode, and providing the boost error signal stored within said storage to said boost circuit as an error compensation signal for said boost circuit in the normal signal processing mode.

7. The error compensation circuit as claimed in claim 6, wherein said boost error detector comprises:

a peak detector detecting and outputting a peak value of the output signal from said boost circuit;

a bottom detector detecting and outputting a bottom value of the output signal from said boost circuit;

a differential amplifier amplifying a level difference between the peak value and the bottom value to generate the amplified difference level;

a level comparator comparing the amplified difference level with the reference voltage level to generate a comparison signal; and an integrator integrating the comparison signal to generate the boost error signal.

8. The error compensation circuit as claimed in claim 6, wherein said storage comprises:

a analog-to-digital converter converting the boost error signal into a digital boost error signal;

a latch latching the digital boost error signal by a control operation of said controller, to generate a digital boost compensation signal; and a digital-to-analog convertor converting the digital boost compensation signal into an analog boost compensation signal to provide said boost circuit with the boost compensation signal.

9. An error compensation circuit comprising:

a filter filtering an input signal with a frequency characteristic;

a boost circuit boosting a gain of an output signal of said filter a predetermined frequency region;

a switch selecting one of a normal input signal and a reference signal according to a mode control signal, and outputting the selected signal to said filter and said boost circuit;

a frequency error detector, in an error compensation mode,
  detecting an output signal level from said filter,
  comparing the output signal level from the filter with a given first reference voltage level Vref1,
  integrating the comparison result, and generating a first design parameter error signal to compensate for design parameter errors based on the frequency characteristic of said filter used for detecting the first design parameter error, and
  compensating therefor;

a boost error detector, in an error compensation mode,
  detecting an output signal level from said boost circuit,
  comparing the output signal level from said boost circuit with a second reference voltage level Vref2, and
  integrating the comparison result to generate a second design parameter error signal to compensate for a second design parameter error based on a boost level of said boost circuit;

a storage storing the first design parameter error signal and the second design parameter error signal; and a controller controlling said switch with a mode control signal according to one of a normal input signal processing mode and the error compensation mode, and providing the first design parameter error signal and the second design parameter error signal to said filter and said boost circuit respectively, wherein the frequency compensation signal and the boost compensation signal are used as an error compensation signal for said filter and said boost circuit in the normal signal processing mode.

10. The error compensation circuit as claimed in claim 9, wherein said frequency and boost error detectors each comprise:

a peak detector detecting and outputting peak values of output signals;

a bottom detector detecting and outputting bottom values of the output signals;

a differential amplifier amplifying a respective level difference between the peak values and the bottom values, to generate amplified difference levels;

a level comparator comparing the amplified difference levels with reference voltage levels to generate comparison signals; and an integrator integrating the comparison signals.

11. The error compensation circuit as claimed in claim 9, wherein said storage comprises:

a first analog-to-digital converter converting the frequency error signal into a digital frequency error signal;

a second analog-to-digital converter converting the boost error signal into a digital boost error signal;

a first latch latching the digital frequency error signal to generate a digital frequency compensation signal;

a second latch latching the digital boost error signal to generate a digital boost compensation signal;

a first digital-to-analog convertor converting the digital frequency compensation signal into a analog frequency compensation signal and providing said filter with the frequency compensation signal; and a second digital-to-analog convertor converting the digital boost compensation signal into a analog boost compensation signal and providing said boost circuit with the boost compensation signal.

12. An error compensation method comprising:

selectively receiving one of a normal input signal, in a normal input signal processing mode, and a reference signal, in an error compensation mode;

switching the received signal to a filter and a boost circuit;

detecting an output signal level from the filter in an error compensation mode;

comparing the output signal level from the filter with a given first reference voltage level Vref1;

integrating the compared result to generate a first design parameter error signal, to compensate for design parameter errors based on a frequency characteristic of the filter;

detecting an output signal level from the boost circuit in an error compensation mode for comparing the output signal level from the boost circuit with a second reference voltage level Vref2;

integrating the compared result to generate a second design parameter error signal to compensate for design parameter errors based on a boost level of the boost circuit;

storing the first design parameter error and the second design parameter error;

controlling the switch according to one of a normal input signal processing mode and the error compensation mode; and providing the first design parameter error signal and the second design parameter error signal to the filter and the boost circuit, respectively, the frequency compensation signal and the boost compensation signal being used as an error compensation signal the filter and the boost circuit in the normal signal processing mode.

13. The error compensation method as claimed in claim 12 wherein said detecting an output signal level from the filter comprises:

detecting and outputting a peak value and a bottom value of the output signal from the filter; and amplifying a level difference between a peak value and the bottom value, to generate a amplified difference level.

14. The error compensation method as claimed in claim 12 wherein said detecting an output signal level from the boost circuit comprises:

detecting and outputting a peak value and a bottom value of the output signal from the boost circuit; and amplifying a level difference between a peak value and the bottom value, to generate a amplified difference level.

15. An error compensation circuit for compensating for a design parameter error, comprising:

an integrated circuit element that receives an input signal;

an error detector that
detects an output signal level from said integrated circuit element,
compares the output signal level with a given reference voltage level to produce a comparison result, and
generates an error signal used to compensate for design parameter errors caused by characteristics of said integrated circuit element;

a storage that stores the error signal from said error detector; and a controller that provides the error signal stored within said storage to said integrated circuit element as an error compensation signal.

16. The error compensation circuit as claimed in claim 15, further comprising a switch that selects a normal input signal, in a normal input signal processing mode, and a reference signal, in an error compensation mode, and outputs the selected signal to said integrated circuit element; wherein said error detector, in the error compensation mode, detects the output signal level from said integrated circuit element, compares the output signal level with the given reference voltage level to produce a comparison result, and generates the error signal used to compensate for design parameter errors caused by characteristics of said integrated circuit element; and said controller controls said switch according to one of the normal input signal processing mode and the error compensation mode, and provides the error signal stored within said storage to said integrated circuit element as an error compensation signal in the normal signal processing mode.

17. The error compensation circuit as claimed in claim 15, wherein said error detector comprises:

a peak detector that detects and outputs a peak value of the output signal from said integrated circuit element;

a bottom detector that detects and outputs a bottom value of the output signal from said integrated circuit element;

a differential amplifier that amplifies a level difference between the peak value and the bottom value to generate an amplified difference level;

a level comparator that compares the amplified difference level with the given reference voltage level and generates a comparison signal with the comparison result; and an integrator that integrates the comparison signal to generate the error signal.

18. The error compensation circuit as claimed in claim 15, wherein said storage comprises:

an analog-to-digital converter to convert the error signal into a digital error signal;

a latch that latches the digital frequency error signal and generates a digital compensation signal; and a digital-to-analog convertor that converts the digital compensation signal into a analog compensation signal, the digital-to-analog convertor outputs the analog compensation signal to said integrated circuit element as a compensation signal.

19. The error compensation circuit as claimed in claim 16, wherein said error detector comprises:

a peak detector that detects and outputs a peak value of the output signal from said integrated circuit element;

a bottom detector that detects and outputs a bottom value of the output signal from said integrated circuit element;

a differential amplifier that amplifies a level difference between the peak value and the bottom value to generate an amplified difference level;

a level comparator that compares the amplified difference level with the given reference voltage level and generates a comparison signal with the comparison result; and an integrator that integrates the comparison signal to generate the error signal.

20. The error compensation circuit as claimed in claim 16, wherein said storage comprises:

an analog-to-digital converter to convert the error signal into a digital error signal;

a latch that latches the digital frequency error signal and generates a digital compensation signal; and a digital-to-analog convertor that converts the digital compensation signal into a analog compensation signal, the digital-to-analog convertor outputs the analog compensation signal to said integrated circuit element as a compensation signal.

* * * * *

UNITED STATES PATENT AND TRADEMARK OFFICE
CERTIFICATE OF CORRECTION

PATENT NO. : 6,236,898 B1
DATED : May 22, 2001
INVENTOR(S) : Chun-Sup Kim

It is certified that error appears in the above-identified patent and that said Letters Patent is hereby corrected as shown below:

<u>Title page,</u>
Item [56] References Cited, "4,457,471" should be -- 4,458,471 --;

<u>Column 10,</u>
Line 50, "convertor" should be -- converter --.

Signed and Sealed this

Twenty-sixth Day of February, 2002

Attest:

JAMES E. ROGAN
*Attesting Officer*     Director of the United States Patent and Trademark Office